United States Patent
Himeno et al.

(10) Patent No.: US 7,994,091 B2
(45) Date of Patent: Aug. 9, 2011

(54) METHOD FOR PRODUCING PALLADIUM-CONTAINING CATALYST

(75) Inventors: Yoshiyuki Himeno, Hiroshima (JP); Ken Ooyachi, Hiroshima (JP); Toshiya Yasukawa, Hiroshima (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 305 days.

(21) Appl. No.: 12/159,396

(22) PCT Filed: Dec. 26, 2006

(86) PCT No.: PCT/JP2006/325854
§ 371 (c)(1),
(2), (4) Date: Sep. 30, 2008

(87) PCT Pub. No.: WO2007/074804
PCT Pub. Date: Jul. 5, 2007

(65) Prior Publication Data
US 2010/0234639 A1 Sep. 16, 2010

(30) Foreign Application Priority Data
Dec. 27, 2005 (JP) .................. 2005-375348

(51) Int. Cl.
*B01J 23/44* (2006.01)
*C07C 51/16* (2006.01)
(52) U.S. Cl. .................. 502/339; 562/533; 562/546
(58) Field of Classification Search .......... 502/339; 562/533, 546
See application file for complete search history.

(56) References Cited

U.S. PATENT DOCUMENTS

| | | | | |
|---|---|---|---|---|
| 3,410,807 A | * | 11/1968 | Lloyd | 502/169 |
| 4,004,051 A | * | 1/1977 | Kadison et al. | 427/304 |
| 4,016,200 A | | 4/1977 | Onoda et al. | |
| 4,435,598 A | * | 3/1984 | Hinnenkamp | 562/546 |
| 5,250,101 A | * | 10/1993 | Hidaka et al. | 75/362 |
| 2007/0142666 A1 | | 6/2007 | Himeno et al. | |
| 2007/0238903 A1 | | 10/2007 | Ninomiya et al. | |
| 2008/0064899 A1 | | 3/2008 | Kawato et al. | |

FOREIGN PATENT DOCUMENTS

| | | |
|---|---|---|
| EP | 0 145 469 | 6/1985 |
| JP | 60 155148 | 8/1985 |
| JP | 2004 141863 | 5/2004 |
| JP | 2005 324084 | 11/2005 |
| WO | 02 083299 | 10/2002 |

OTHER PUBLICATIONS

U.S. Appl. No. 11/816,584, filed Aug. 17, 2007, Yasukawa, et al.
U.S. Appl. No. 11/719,461, filed Apr. 2, 2008, Himeno, et al.

* cited by examiner

*Primary Examiner* — Taylor Victor Oh
(74) *Attorney, Agent, or Firm* — Oblon, Spivak, McClelland, Maier & Neustadt, L.L.P.

(57) ABSTRACT

Disclosed is a palladium-containing catalyst for producing an α, β-unsaturated carboxylic acid from an olefin or an α, β-unsaturated aldehyde in high productivity. Also disclosed are a method for producing such a catalyst, and a method for producing an α, β-unsaturated carboxylic acid in high productivity. Specifically, a palladium-containing catalyst is produced by a method containing a step in which palladium in an oxidation state is reduced by a compound (A) which is represented by the following formula (1).

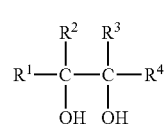

(1)

9 Claims, No Drawings

METHOD FOR PRODUCING PALLADIUM-CONTAINING CATALYST

This application is a 371 of PCT/JP2006/325854, filed Dec. 26, 2006.

TECHNICAL FIELD

The present invention relates to a method for producing a palladium-containing catalyst for producing an α,β-unsaturated carboxylic acid from an olefin or an α, β-unsaturated aldehyde. Further, the present invention relates to a method for producing an α,β-unsaturated carboxylic acid.

BACKGROUND ART

As a palladium-containing catalyst for producing an α,β-unsaturated carboxylic acid through liquid-phase oxidation of an olefin with molecular oxygen, for example, a palladium metal catalyst obtained by reducing palladium in an oxidation state by an olefin has been proposed in Patent Documents 1 and 2. Further, a palladium metal catalyst obtained by reducing a palladium compound to palladium metal using formalin, hydrazine, hydrogen, methanol, or an olefin such as ethylene, propylene, or butene as a reducing agent is described in Patent Document 3.

Patent Document 1: International Publication No. WO 02/083,299
Patent Document 2: Japanese Patent Application Laid-Open No. Sho 60-155,148
Patent Document 3: U.S. Pat. No. 4,016,200

DISCLOSURE OF INVENTION

Problem to be Solved by the Invention

However, productivities of the α,β-unsaturated carboxylic acid of the catalysts produced by the methods described in Patent Documents 1 to 3 were not sufficient and a catalyst for producing an α,β-unsaturated carboxylic acid having higher productivity has been desired.

Therefore, it is an object of the present invention to provide a palladium-containing catalyst which enables to produce an α,β-unsaturated carboxylic acid from an olefin or an α,β-unsaturated aldehyde in high productivity. It is another object of the present invention to provide a method for producing such a catalyst. It is also another object of the present invention to provide a method for producing an α,β-unsaturated carboxylic acid in high productivity.

Means for Solving the Problem

One aspect of the present invention is a method for producing a palladium-containing catalyst for producing an α,β-unsaturated carboxylic acid from an olefin or an α, β-unsaturated aldehyde, which comprises the step of reducing palladium in an oxidation state by a compound (A) which is represented by the following formula (1).

[Formula 1]

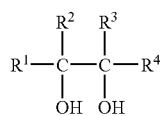

(1)

(In the formula (1), each of $R^1$ to $R^4$ independently represents hydrogen atom or an organic group, and any two groups out of $R^1$ to $R^4$ may be combined to form a ring structure.)

A particularly preferable embodiment thereof is a method for producing a palladium-containing catalyst, which comprises the step of reducing palladium in an oxidation state by the compound (A) that is ethylene glycol, propylene glycol, glycerin, or L-ascorbic acid.

Further, another aspect of the present invention is a palladium-containing catalyst produced by the aforementioned method.

Furthermore, another aspect of the present invention is a method for producing an α, β-unsaturated carboxylic acid through liquid-phase oxidation of an olefin or an α, β-unsaturated aldehyde with molecular oxygen using the aforementioned palladium-containing catalyst.

Effect of the Invention

According to the method for producing a palladium-containing catalyst of the present invention, a palladium-containing catalyst that can produce an α,β-unsaturated carboxylic acid from an olefin or an α,β-unsaturated aldehyde in high productivity can be produced.

Further, according to the palladium-containing catalyst of the present invention, an α, β-unsaturated carboxylic acid can be produced from an olefin or an α,β-unsaturated aldehyde in high productivity.

Furthermore, according to the method for producing an α,β-unsaturated carboxylic acid through liquid-phase oxidation of an olefin or an α,β-unsaturated aldehyde with molecular oxygen of the present invention, the α,β-unsaturated carboxylic acid can be produced in high productivity.

BEST MODE FOR CARRYING OUT THE INVENTION

The palladium-containing catalyst of the present invention is the one for producing an α,β-unsaturated carboxylic acid and contains at least palladium metal. The palladium-containing catalyst of the present invention may contain other metal components other than palladium metal. As the other metal components other than palladium metal, for example, ruthenium, rhodium, silver, osmium, iridium, platinum, gold, copper, antimony, tellurium, lead, and bismuth can be listed. It is preferable that 50% by mass or more of the metals contained in the palladium-containing catalyst be palladium metal from the viewpoint of realizing high catalyst activity.

The palladium-containing catalyst of the present invention may or may not be supported on a carrier. When the carrier is used, the loading ratio of metal components containing palladium is preferably 0.1% by mass or more to the carrier that is before the metal components have been supported, more preferably 0.5% by mass or more, and furthermore preferably 1% by mass or more, and preferably 40% by mass or less, more preferably 30% by mass or less, and furthermore preferably 20% by mass or less.

The carrier is not particularly limited, and for example, activated carbon, silica, alumina, silica-alumina, magnesia, calcia, titania, or zirconia can be listed, and among them, activated carbon, silica, titania, or zirconia is preferable. The carrier can be used alone or in combination of two or more kinds.

Specific surface area of the carrier is variable depending on the kind of the carrier and cannot be absolutely said, however, in the case of silica, it is preferably 50 m²/g or more and more preferably 100 m²/g or more, and preferably 1,500 m²/g or less and more preferably 1,000 m²/g or less. As the specific surface area of the carrier becomes smaller, a catalyst in which its useful components are supported more on its surface can be produced, and as the specific surface area of the carrier becomes larger, a catalyst in which its useful components are supported more can be produced.

Such a palladium-containing catalyst of the present invention is produced by a method which contains the step of reducing palladium in an oxidation state by a compound (A) which is represented by the following formula (1). An α,β-unsaturated carboxylic acid can be produced from an olefin or an α,β-unsaturated aldehyde in high productivity by using the palladium-containing catalyst obtained by this method for producing the palladium-containing catalyst.

[Formula 2]

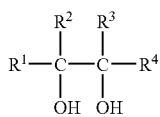

(1)

(In the formula (1), each of $R^1$ to $R^4$ independently represents hydrogen atom or an organic group, and any two groups out of $R^1$ to $R^4$ may be combined to form a ring structure.)

The organic group that can be $R^1$ to $R^4$ is not particularly limited, and a monovalent organic group such as an alkyl group, an alkylcarbonyl group, a carboxyl group, a hydroxyl group, a substitution group represented by the following formula (3), or an alkyl group having a carboxyl group or hydroxyl group can be listed.

[Formula 3]

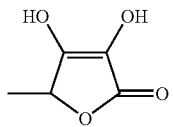

(3)

The number of carbon atoms in the alkyl group is preferably 1 to 6. The number of carbon atoms in the compound (A) is preferably 2 to 8.

The compound (A) is not particularly limited as long as it has the structure which is represented by the formula (1). As the compound (A), for example, ethylene glycol, glycerin, L-ascorbic acid, propylene glycol, 1,2-butanediol, 2,3-butanediol, 1,2-pentanediol, 1,2,6-hexanetriol, 1-thioglycerol, or L-ascorbic acid 2-glucoside can be listed. Among the compounds which are represented by the formula (1), the compounds which are represented by the formula (2) are preferable.

[Formula 4]

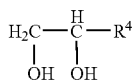

(2)

(In the formula (2), $R^4$ represents hydrogen atom or an organic group.)

Among these compounds, a compound in which $R^4$ is a hydrogen atom or an alkyl group having 1 to 4 carbon atoms, glycerin, or L-ascorbic acid is more preferable, and ethylene glycol, propylene glycol, glycerin, or L-ascorbic acid is particularly preferable.

The amount of the compound (A) to be used is not particularly limited, however, it is preferably 1 to 1,000 moles to 1 mole of palladium in an oxidation state and more preferably 5 to 100 moles.

The method for reducing palladium in the oxidation state by the compound (A) is not particularly limited, however, a method of reducing a raw material of palladium, having palladium in the oxidation state, in a liquid phase is preferable.

As a solvent to be used for reduction in the liquid phase, water is preferable, however, organic solvents like alcohols such as ethanol, 1-propanol, 2-propanol, n-butanol, and t-butanol; ketones such as acetone, methyl ethyl ketone, methyl isobutyl ketone, and cyclohexanone; organic acids such as acetic acid, n-valeric acid, and isovaleric acid; and hydrocarbons such as heptane, hexane, and cyclohexane can be used alone or in combination of two or more kinds, depending on dispersibility of the carrier. Further, a mixed solvent of these compounds and water can also be used. When the mixed solvent of the organic solvent and water is used, the mixing ratio of the organic solvent and water is optional, however, water content in the whole mixed solvent is preferably 5 to 50% by mass.

As the palladium raw material having palladium in the oxidation state, for example, a palladium salt, a palladium oxide, or a palladium oxide alloy can be listed, and among them, a palladium salt or a palladium oxide is preferable. As the palladium salt, for example, palladium chloride, palladium acetate, palladium nitrate, palladium sulfate, tetraammine palladium nitrate, or bis(acethylacetonate) palladium can be listed, and among them, palladium chloride, palladium acetate, palladium nitrate, or tetraammine palladium nitrate is preferable.

In the case of reduction in the liquid phase, the raw material of palladium, having palladium in the oxidation state, is dissolved or dispersed in the solvent, and reduction is carried out by adding the compound (A) to the resultant dissolution liquid or dispersion liquid. In the case of using the carrier, reduction can also be carried out by adding the compound (A) to a dispersion liquid of the carrier on which the raw material of palladium, having palladium in the oxidation state, has been supported.

When the palladium-containing catalyst containing a metal component other than palladium metal is produced, the same reduction as that mentioned above can be carried out using a raw material of metal such as a metal salt or a metal oxide corresponding to the metal component to obtain the catalyst. In the case of using the carrier, the same reduction as that mentioned above can be carried out in a state that the raw material of metal has been supported on the carrier to obtain the catalyst. Further, the raw material of metal can be reduced before palladium is reduced or after palladium is reduced or at the same time with palladium.

Further, in order to obtain an excellent dispersion state of palladium metal in the palladium-containing catalyst which is finally obtained, it is preferable to apply a method in which a palladium salt is supported on the carrier at first, and then, the resultant carrier is subjected to a heat treatment to decompose at least part of the palladium salt into palladium oxide, and then, reduction is carried out.

As a method for supporting the palladium salt on the carrier, a method in which a solvent is evaporated after the carrier is soaked into the solution of the palladium salt or a method, which is called pore-filling method, in which a solvent is evaporated after a certain amount of the solution of the palladium salt equivalent to the pore volume of the carrier is absorbed in the carrier is preferable. The solvent for dissolving the palladium salt is not particularly limited as long as it dissolves the palladium salt.

The temperature of the heat treatment is preferably the thermal decomposition temperature of the palladium salt or above, and is preferably 800° C. or below and more preferably 700° C. or below. The method for raising temperature to a predetermined temperature of the heat treatment is not particularly limited, however, the rate of raising temperature is preferably 1 to 10° C./minute in order to obtain an excellent dispersion state of palladium in the supported palladium-containing catalyst. The holding time after the predetermined temperature of the heat treatment is reached is not particularly limited as long as it is enough for the thermal decomposition of the palladium salt, however, it is preferably 1 to 12 hours.

Further, it is preferable to carry out the heat treatment at the thermal decomposition temperature of the palladium salt or above in order to change the palladium salt into palladium oxide. By doing so, it is possible to suppress agglomeration and growth of palladium particles, and hence dispersibility of the palladium particles is improved and it becomes possible to produce an $\alpha,\beta$-unsaturated carboxylic acid from an olefin or an $\alpha,\beta$-unsaturated aldehyde in high selectivity.

As the palladium salt, it is preferable to use the one having the thermal decomposition temperature of 400° C. or below. The thermal decomposition temperature of the palladium salt is more preferably 300° C. or below and particularly preferably 200° C. or below. As the thermal decomposition temperature of the palladium salt becomes lower, exothermic heat becomes smaller. In particular, by using the palladium salt having the thermal decomposition temperature of 200° C. or below, it is possible to reduce exothermic heat to suppress agglomeration and growth of palladium particles even in the case that the thickness of the bed height of the carrier on which the palladium salt is supported at the time of the heat treatment is large. Consequently, it becomes possible to produce an $\alpha,\beta$-unsaturated carboxylic acid in higher selectivity. In the catalyst production on an industrial scale, it has a large merit, in the case of scale up, that the catalyst having high selectivity to an $\alpha,\beta$-unsaturated carboxylic acid can be produced even when the thickness of the bed height of the carrier is large, because it is usually unavoidable that the thickness of the bed height of the carrier on which the palladium salt is supported at the time of the heat treatment becomes large in relation to a catalyst amount and a scale of a calcination apparatus.

As a particularly preferable embodiment, a method can be listed, in which the palladium salt having the thermal decomposition temperature of 400° C. or below is supported on the carrier, and the resultant carrier on which the palladium salt is supported is subjected to the heat treatment at a temperature of the thermal decomposition temperature of the palladium salt or above to obtain a catalyst precursor in which part of the palladium salt supported on the carrier has been changed into palladium oxide, and then, the catalyst precursor is subjected to a reduction treatment.

As the palladium salt to be used, for example, palladium chloride (II) (thermal decomposition temperature of 650° C.), palladium acetate (II) (thermal decomposition temperature of 230° C.), palladium nitrate (II) (thermal decomposition temperature of 120° C.), tetraammine palladium (II) nitrate (thermal decomposition temperature of 220° C.), or bis(acethylacetonate) palladium (II) (thermal decomposition temperature of 210° C.) can be listed. Among them, palladium acetate (II), palladium nitrate (II), tetraammine palladium (II) nitrate, or bis(acethylacetonate) palladium (II) is preferable. The palladium salt can be used alone or in combination of two or more kinds.

The thermal decomposition temperature of the palladium salt can be measured with thermogravimetry. The thermal decomposition temperature of the palladium salt was defined as the temperature at which 10% by mass of the palladium salt was reduced while the palladium salt was heated from the room temperature at a rate of 5.0° C./minute in an air flow using a thermogravimeter (trade name: TGA-50, manufactured by Shimadzu Corporation).

Through the above-mentioned heat treatment, a catalyst precursor in which part of the palladium salt supported on the carrier has been decomposed into palladium oxide is obtained. It is preferable to carry out reduction treatment of palladium oxide contained in the catalyst precursor obtained through the above-mentioned heat treatment. In the case that a palladium salt exists on the carrier of the catalyst precursor, the palladium salt is also simultaneously subjected to the reduction treatment The apparatus for reducing palladium in an oxidation state is not particularly limited as long as it can add the compound (A) into a solution or a dispersion liquid containing palladium in the oxidation state.

The reduction temperature and the reduction time are variable depending on a kind of the compound (A), however, the reduction temperature is preferably −5 to 150° C. and more preferably 15 to 80° C. The reduction time is preferably 0.1 to 4 hours and more preferably 0.25 to 3 hours, and furthermore preferably 0.5 to 2 hours.

At least part of palladium in the oxidation state is reduced to palladium metal through the above-mentioned reduction treatment.

After the reduction, the obtained palladium-containing catalyst is separated. The method for separating the catalyst is not particularly limited, and for example, filtration method or centrifugation method can be used. The separated palladium-containing catalyst is properly dried. The drying method is not particularly limited and various methods can be used.

In the next place, the method for producing an $\alpha,\beta$-unsaturated carboxylic acid through liquid-phase oxidation of an olefin or an $\alpha,\beta$-unsaturated aldehyde with molecular oxygen using the palladium-containing catalyst of the present invention will be explained.

As the olefin which is the raw material, for example, propylene, isobutylene, or 2-butene can be listed. Further, as the $\alpha,\beta$-unsaturated aldehyde which is the raw material, for example, acrolein, methacrolein, crotonaldehyde ($\beta$-methyl acrolein), or cinnamaldehyde ($\beta$-phenyl acrolein) can be listed. The olefin or $\alpha,\beta$-unsaturated aldehyde which is the raw material may contain a small quantity of at least one of a saturated hydrocarbon and a lower saturated aldehyde as impurities.

The $\alpha,\beta$-unsaturated carboxylic acid to be produced is, when the raw material is the olefin, the one having the same carbon skeleton as the olefin has. While, when the raw material is the $\alpha,\beta$-unsaturated aldehyde, the $\alpha,\beta$-unsaturated carboxylic acid to be produced is the one in which the aldehyde group of the $\alpha,\beta$-unsaturated aldehyde has changed into the carboxyl group.

The method for producing an $\alpha,\beta$-unsaturated carboxylic acid of the present invention is suitable for liquid-phase oxidation for producing acrylic acid from propylene or acrolein or for producing methacrylic acid from isobutylene or methacrolein.

As a source for molecular oxygen to be used in the liquid-phase oxidation reaction, air is economical, however, pure oxygen or a mixed gas of pure oxygen and air can be used, and if necessary, a diluted mixed gas in which air or pure oxygen is diluted with nitrogen, carbon dioxide, water vapor, or the like can also be used.

The solvent to be used in the liquid-phase oxidation reaction is not particularly limited, and for example, water; an alcohol such as tertiary butanol or cyclohexanol; a ketone such as acetone, methyl ethyl ketone, or methyl isobutyl ketone; an organic acid such as acetic acid, propionic acid, n-butyric acid, isobutyric acid, n-valeric acid, or isovaleric acid; an organic acid ester such as ethyl acetate or methyl propionate; or a hydrocarbon such as hexane, cyclohexane, or toluene can be used. Among them, an organic acid having 2 to 6 carbon atoms, a ketone having 3 to 6 carbon atoms, or tertiary butanol is preferable. The solvent may be used alone or in combination of two or more kinds. Further, when at least one solvent selected from the group consisting of alcohols, ketones, organic acids, and organic acid esters is used, it is preferable to use the mixed solvent of the selected solvent and water. In this case, the amount of water is not particularly limited, however, it is preferably 2 to 70% by mass to the mass of the mixed solvent and more preferably 5 to 50% by mass. The solvent is preferably homogeneous, but it may safely be used in a heterogeneous state.

The liquid-phase oxidation reaction may be carried out by any one process of continuous process and batch process, however, it is preferably carried out by continuous process industrially in consideration of productivity.

The amount of the olefin or the $\alpha,\beta$-unsaturated aldehyde to be used, which is the raw material of the liquid-phase oxidation reaction, is preferably 0.1 to 20 parts by mass to 100 parts by mass of the solvent and more preferably 0.5 to 10 parts by mass.

The amount of molecular oxygen to be used is preferably 0.1 to 30 moles to 1 mole of the olefin or the $\alpha,\beta$-unsaturated aldehyde which is the raw material, more preferably 0.3 to 25 moles, and particularly preferably 0.5 to 20 moles.

The catalyst is preferably used in a suspended state in the reaction liquid of the liquid-phase oxidation, however, it may be used in a fixed bed. The amount of the catalyst to be used is preferably 0.1 to 30 parts by mass as the catalyst existing in a reactor to 100 parts by mass of the solution existing in the reactor, more preferably 0.5 to 20 parts by mass, and particularly preferably 1 to 15 parts by mass.

The reaction temperature and the reaction pressure are properly selected depending on the solvent and the raw material of the reaction to be used. The reaction temperature is preferably 30 to 200° C. and more preferably 50 to 150° C. The reaction pressure is preferably atmospheric pressure (0 MPa (gauge pressure; hereinafter, all pressures being expressed in gauge pressure)) to 10 MPa and more preferably 2 to 7 MPa.

EXAMPLES

Hereinafter, the present invention will be more concretely explained by Examples and Comparative Examples, however, the present invention is not limited to these Examples. In the following Examples and Comparative Examples, "part" means "part by mass".

(Analysis of Raw Materials and Products)

The analysis of raw materials and products was carried out using gas chromatography. Now, ratio of reaction of an olefin or an $\alpha,\beta$-unsaturated aldehyde which is the raw material and productivity of an $\alpha,\beta$-unsaturated aldehyde to be produced are defined in the following.

Ratio of reaction of an olefin or an $\alpha,\beta$-unsaturated aldehyde (%)=(B/A)×100

Productivity of an $\alpha,\beta$-unsaturated carboxylic acid (g/gPd/h)=(C/D/E)

Wherein, A represents number of moles of an olefin or an $\alpha,\beta$-unsaturated aldehyde supplied, B represents number of moles of an olefin or an $\alpha,\beta$-unsaturated aldehyde reacted, C represents mass (g) of an $\alpha,\beta$-unsaturated carboxylic acid produced, D represents mass (g) of palladium metal in a catalyst, and E represents reaction time (h).

In the following Examples and Comparative Examples, the reaction producing methacrylic acid from isobutylene was carried out, and in this case, A represents number of moles of isobutylene supplied, B represents number of moles of isobutylene reacted, and C represents mass (g) of methacrylic acid produced.

Example 1

(Preparation of Catalyst)

To 40.0 parts of palladium (II) nitrate solution (nitric acid aqueous solution containing 2.5% by mass of palladium), 20.0 parts of a silica carrier (specific surface area of 450 m$^2$/g, pore volume of 0.68 cc/g) was soaked, and an aqueous solution obtained by dissolving 0.22 part of telluric acid into 10 parts of pure water was further added, and the resultant mixture was evaporated. Subsequently, the evaporated mixture was subjected to the heat treatment of heating from the room temperature to 200° C. at the rate of 1.5° C./minute in air and holding for 3 hours at 200° C., and cooled to the room temperature. The XRD measurement was carried out on the obtained catalyst precursor, and formation of palladium oxide was confirmed.

The catalyst precursor was added to 50.0 parts of ethylene glycol which is a reducing agent. The obtained mixture was subjected to the reduction treatment of heating to 70° C. and holding for 2 hours. The mixture after subjected to the reduction treatment was filtrated under suction, and the obtained solid matter was filtrated while washed with 1,000 parts of pure water. Further, the solid matter was dried for 2 hours at 100° C. under a nitrogen flow to obtain silica-supported palladium-containing catalyst (the loading ratio of palladium metal being 5.0% by mass). The XRD measurement was carried out on the obtained catalyst, and disappearance of the XRD peaks derived from palladium oxide and formation of palladium metal were confirmed.

(Evaluation of Reaction)

One fourth of the catalyst obtained by the above-mentioned method (corresponding to 0.25 part of palladium metal) was filtrated while washed with 75% by mass t-butanol aqueous solution. The resultant catalyst and 75 parts of 75% by mass t-butanol aqueous solution as a reaction solvent were introduced into an autoclave and the autoclave was shut tight. Subsequently, 2.0 parts of isobutylene was introduced into the autoclave, and the system was stirred (number of revolutions of 1,000 rpm) and heated to 90° C. After the heating was finished, nitrogen was introduced into the autoclave to the internal pressure of 2.4 MPa and then compressed air was introduced into the autoclave to the internal pressure of 4.8 MPa and the reaction was started. Each time when the internal pressure dropped by 0.1 MPa (the internal pressure of 4.7 MPa), oxygen was introduced into the autoclave by 0.1 MPa, and this operation was repeated during the reaction. The internal pressure right after each introduction of oxygen was 4.8 MPa. The reaction was finished when 30 minutes passed from the start.

After the reaction was finished, the inside of the autoclave was cooled in an ice bath. A gas-sampling bag was attached to the gas outlet of the autoclave and the gas outlet was opened and the emerging gas was collected while the internal pressure of the reactor was released. The reaction liquid containing catalyst was taken out from the autoclave and the catalyst was separated by membrane filter and the reaction liquid was recovered. The recovered reaction liquid and the sampled gas were analyzed with gas chromatography and ratio of reaction and productivity were calculated.

Example 2

Preparation of Catalyst

The same procedure as in Example 1 was carried out except that 50.0 parts of 20% by mass L-ascorbic acid aqueous solution was used instead of 50.0 parts of ethylene glycol in the reduction treatment.
(Evaluation of Reaction)
The same procedure as in Example 1 was carried out.

Example 3

(Preparation of Catalyst)
The same procedure as in Example 1 was carried out except that 50.0 parts of 50% by mass ethylene glycol aqueous solution was used instead of 50.0 parts of ethylene glycol in the reduction treatment.
(Evaluation of Reaction)
The same procedure as in Example 1 was carried out.

Example 4

(Preparation of Catalyst)
The same procedure as in Example 1 was carried out except that 50.0 parts of glycerin was used instead of 50.0 parts of ethylene glycol in the reduction treatment.
(Evaluation of Reaction)
The same procedure as in Example 1 was carried out.

Example 5

(Preparation of Catalyst)
The same procedure as in Example 1 was carried out except that 50.0 parts of propylene glycol was used instead of 50.0 parts of ethylene glycol in the reduction treatment.
(Evaluation of Reaction)
The same procedure as in Example 1 was carried out.

Comparative Example 1

(Preparation of Catalyst)
The same procedure as in Example 1 was carried out except that 50.0 parts of ethanol was used instead of 50.0 parts of ethylene glycol in the reduction treatment.
(Evaluation of Reaction)
The same procedure as in Example 1 was carried out.

Comparative Example 2

(Preparation of Catalyst)
To 60 parts of 85% by mass acetic acid aqueous solution, 1.1 parts of palladium (II) acetate was dissolved while heated at 80° C., and an aqueous solution obtained by dissolving 0.11 part of telluric acid into 10 parts of pure water was added. The resultant mixture was introduced into an autoclave having inside volume of 150 ml together with 10.0 parts of a silica carrier (specific surface area of 450 m²/g, pore volume of 0.68 cc/g), and the autoclave was shut tight. The system was stirred at 500 rpm, and the inside of the autoclave was replaced by nitrogen by introducing nitrogen gas into the autoclave to the internal pressure of 0.8 MPa and repeating this operation 3 times. Subsequently, propylene as a reducing agent was introduced into the autoclave from the internal pressure of the atmospheric pressure to 0.6 MPa, and the system was heated to 80° C. and held for 1 hour to carry out reduction treatment.

After the autoclave was cooled to the room temperature, the internal pressure of the system was released and the autoclave was opened. The reaction mixture was filtrated under suction, and the obtained solid matter was filtrated while washed with 1,000 parts of pure water. Further, the solid matter was dried for 2 hours at 100° C. under nitrogen flow to obtain silica-supported palladium-containing catalyst (the loading ratio of palladium metal being 5.0% by mass). The XRD measurement was carried out on the obtained catalyst, and formation of palladium metal was confirmed.
(Evaluation of Reaction)
The same procedure as in Example 1 was carried out except that one half of the catalyst obtained by the above-mentioned method (corresponding to 0.25 part of palladium metal) was used.

The above-mentioned results are collectively shown in Table 1. As shown in this table, it is found that an α,β-unsaturated carboxylic acid can be produced in a higher productivity by the catalyst produced according to the method of the present invention.

Comparative Example 3

(Preparation of Catalyst)
The same procedure as in Example 1 was carried out except that 50.0 parts of 37% by mass formaldehyde aqueous solution was used instead of 50.0 parts of ethylene glycol in the reduction treatment.
(Evaluation of Reaction)
The same procedure as in Example 1 was carried out.

TABLE 1

| | Reducing agent or reducing agent-containing liquid | Ratio of reaction of isobutylene (%) | Productivity of methacrylic acid (g/gPd/h) |
|---|---|---|---|
| Example 1 | Ethylene glycol | 54.8 | 3.4 |
| Example 2 | 20% by mass L-ascorbic acid aqueous solution | 56.7 | 3.2 |
| Example 3 | 50% by mass ethylene glycol aqueous solution | 53.4 | 3.4 |
| Example 4 | Glycerin | 52.9 | 3.3 |
| Example 5 | Propylene glycol | 50.6 | 2.8 |
| Comp. Ex. 1 | Ethanol | 30.7 | 1.5 |
| Comp. Ex. 2 | Propylene | 18.3 | 0.6 |
| Comp. Ex. 3 | 37% by mass formaldehyde aqueous solution | 46.8 | 2.5 |

What is claimed is:

1. A method for producing a catalyst comprising palladium, the method comprising reducing palladium in an oxidation state by a compound (A) represented by the following formula (1):

[Formula 1]

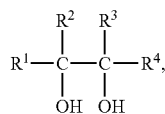

$$R^1-\underset{\underset{OH}{|}}{\overset{\overset{R^2}{|}}{C}}-\underset{\underset{OH}{|}}{\overset{\overset{R^3}{|}}{C}}-R^4, \tag{1}$$

wherein each of $R^1$ to $R^4$ independently represents a hydrogen atom, an alkyl group, or an alkyl group having a hydroxyl group.

2. A method for producing an α, β-unsaturated carboxylic acid comprising producing a palladium-containing catalyst according to the method of claim 1 and liquid-phase oxidizing an olefin or an α, β-unsaturated aldehyde with molecular oxygen in the presence of the palladium-containing catalyst.

3. The method according to claim 1, wherein a palladium salt having a thermal decomposition temperature of 400° C. or below is supported on a carrier, and the resultant carrier on which the palladium salt is supported is subjected to heat treatment at or above the thermal decomposition temperature of the palladium salt to obtain a catalyst precursor, followed by subjecting the catalyst precursor to a reduction treatment with said compound (A).

4. The method according to claim 3, wherein said palladium salt is at least one salt selected from the group consisting of palladium chloride (II), palladium acetate (II), palladium nitrate (II), tetraammine palladium (II) nitrate, and bis(acethylacetonate) palladium (II).

5. A method for producing a catalyst comprising palladium, the method comprising reducing palladium in an oxidation state by a compound (A) selected from the group consisting of ethylene glycol, propylene glycol, glycerin, L-ascorbic acid, 1,2-butanediol, 2,3-butanediol, 1,2-pentandiol, 1,2,6-hexanetriol, 1-thioglycerol, and L-ascorbic acid 2-glucoside.

6. The method according to claim 5, wherein compound (A) is selected from the group consisting of ethylene glycol, propylene glycol, glycerin, and L-ascorbic acid.

7. A method for producing an α, β-unsaturated carboxylic acid comprising producing a palladium-containing catalyst according to the method of claim 5 and liquid-phase oxidizing an olefin or an α, β-unsaturated aldehyde with molecular oxygen in the presence of the palladium-containing catalyst.

8. The method according to claim 5, wherein a palladium salt having a thermal decomposition temperature of 400° C. or below is supported on a carrier, and the resultant carrier on which the palladium salt is supported is subjected to heat treatment at or above the thermal decomposition temperature of the palladium salt to obtain a catalyst precursor, followed by subjecting the catalyst precursor to a reduction treatment with said compound (A).

9. The method according to claim 8, wherein said palladium salt is at least one salt selected from the group consisting of palladium chloride (II), palladium acetate (II), palladium nitrate (II), tetraammine palladium (II) nitrate, and bis(acethylacetonate) palladium (II).

* * * * *